(12) United States Patent
Ulm et al.

(10) Patent No.: US 11,031,165 B2
(45) Date of Patent: Jun. 8, 2021

(54) METHOD AND ARRANGEMENT FOR DETERMINING THE ARMATURE POSITION OF AN ELECTROMAGNET

(71) Applicant: VOITH PATENT GMBH, Heidenheim (DE)

(72) Inventors: Juergen Ulm, Schorzberg (DE); Stefan Gradl, Kronau (DE); Pascal Stehlik, Goeppingen (DE); Marc Knorr, Erligheim (DE); Oliver Bredlow, Berlin (DE); Oliver Vogel, Gaisbach (DE); Bastian Motzer, Kuenzelsau (DE)

(73) Assignee: Voith Patent GmbH, Heidenheim (DE)

( * ) Notice: Subject to any disclaimer, the term of this patent is extended or adjusted under 35 U.S.C. 154(b) by 74 days.

(21) Appl. No.: 16/478,947

(22) PCT Filed: Jan. 15, 2018

(86) PCT No.: PCT/EP2018/050834
§ 371 (c)(1),
(2) Date: Jul. 18, 2019

(87) PCT Pub. No.: WO2018/134147
PCT Pub. Date: Jul. 26, 2018

(65) Prior Publication Data
US 2019/0348207 A1 Nov. 14, 2019

(30) Foreign Application Priority Data
Jan. 19, 2017 (DE) .................... 10 2017 200 828.8

(51) Int. Cl.
*G01B 7/14* (2006.01)
*H01F 7/18* (2006.01)
*G01D 5/20* (2006.01)

(52) U.S. Cl.
CPC ............. *H01F 7/1844* (2013.01); *G01D 5/20* (2013.01); *H01F 2007/185* (2013.01); *H01F 2007/1855* (2013.01)

(58) Field of Classification Search
CPC .......... G01D 5/20; G01D 5/145; G01D 5/147; G01D 5/12; G01D 5/14; G01D 5/16;
(Continued)

(56) References Cited

U.S. PATENT DOCUMENTS

| 6,437,962 B1 | 8/2002 | Muraji ........................ 361/170 |
| 7,298,395 B2* | 11/2007 | Fukaya ................. G01D 5/145 348/149 |

(Continued)

FOREIGN PATENT DOCUMENTS

| DE | 22 26 101 A1 | 12/1973 | ............... G01B 7/02 |
| DE | 195 01 766 A1 | 7/1996 | ............... H01F 7/16 |

(Continued)

OTHER PUBLICATIONS

Ambia et al.; *Electrical Impedance Imagine Using Eddy Current*; International Journal of Electrical, Computer, Energetic, Electronic and communication Engineering; vol. 2, No. 4, 2008; pp. 597-600.
International Search Report dated Apr. 26, 2018 in related application No. PCT/EP2018/050834.
Written Opinion (English translation) dated Apr. 26, 2018 in related application No. PCT/EP2018/050/37.

*Primary Examiner* — Thang X Le
(74) *Attorney, Agent, or Firm* — Renner Kenner Greive Bobak Taylor & Weber

(57) ABSTRACT

The present invention relates to a method and an arrangement for determining the armature (1) position of an electromagnet. In the method the potential differences in the yoke (2) or in the armature (1), generated by a non-homogeneous eddy current distribution in the event of a deflection of the armature (1), are detected to determine the instantaneous armature (1) position relative to a reference position from these potential differences. For this purpose at (Continued)

least one voltage difference is measured between two measuring points on the yoke (2) or armature (1), or between one measuring point on the yoke (2) or armature (1) and a reference potential. The armature (1) position relative to a reference position on the electromagnet is then determined from this voltage difference. The method can be performed cost effectively, and can also easily be applied to existing electromagnets.

13 Claims, 4 Drawing Sheets

(58) Field of Classification Search
CPC .... G01D 5/165; G01D 5/2457; G01D 5/2013; G01D 5/2046; G01D 5/24476; G01D 5/245; G01N 27/9033; G01N 27/902; G01N 27/9013; G01N 27/904; G01N 27/223; G01N 27/82; G01N 27/9093
See application file for complete search history.

(56) References Cited

U.S. PATENT DOCUMENTS

| | | | | |
|---|---|---|---|---|
| 7,441,442 B2* | 10/2008 | Morgan | ............... | F16C 32/0446 73/54.28 |
| 2003/0025408 A1* | 2/2003 | Miekka | ................... | B60L 50/60 310/68 R |
| 2010/0019581 A1* | 1/2010 | Pantke | .................. | H01F 7/1844 307/104 |
| 2017/0241413 A1* | 8/2017 | Muller | .................... | F04B 51/00 |

FOREIGN PATENT DOCUMENTS

| | | | | |
|---|---|---|---|---|
| DE | 195 05 219 A1 | 8/1996 | ............... | G01D 5/20 |
| DE | 10 2013 215939 A1 | 2/2015 | ............. | F02D 41/38 |
| DE | 10 2012 005685 A1 | 7/2015 | ............... | G06F 3/02 |
| GB | 2 259 188 A | 3/1993 | ............... | H01F 7/18 |

* cited by examiner

METHOD AND ARRANGEMENT FOR DETERMINING THE ARMATURE POSITION OF AN ELECTROMAGNET

CROSS-REFERENCE TO RELATED APPLICATION

This is a § 371 application of International patent application number PCT/EP2018/050834 filed Jan. 15, 2018, which claims the benefit of German patent application number 10 2017 200 828.8 filed Jan. 19, 2017.

TECHNICAL FIELD OF APPLICATION

The present invention relates to a method and an arrangement for determining the armature position of an electromagnet, as it is used, for example, as an actuator for actuating mechanical or electrical components.

In many applications of electromagnets, it is desirable to monitor the armature position in order, for example, to be able to detect the current state of a mechanism that is actuated by the electromagnet. Concrete examples are the monitoring of the opening or closing position of fire doors operated by electromagnets, or the operation of valves.

PRIOR ART

Previous solutions for monitoring the armature position of an electromagnet use sensors, video analyses, or the evaluation of the excitation current of the electromagnet. When using sensors, however, their use or position must already be taken into account in the design of the magnetic circuit of the electromagnet. An evaluation of the armature position by video analysis is time-consuming and expensive.

From DE 195 05 219 A1 a device for the detection of the armature position of an electromagnetic actuator, which does not require the installation of position sensors, is of known art. The device detects the coil voltage and the coil current of the electromagnet, in order to derive from these the current armature position of a solenoid.

DE 10 2012 005 685 A1 describes a method for determining the armature position of an electromagnet without sensors, in which the armature position is determined from a phase displacement between an alternating voltage component and the alternating current component of the current through the coil of the electromagnet.

From DE 10 2013 215 939 A1 and DE 22 26 101 A methods for determining the armature position of an electromagnet without sensors are also of known art. In the first publication, the alteration of the inductance of a solenoid that moves the armature, which inductance depends on the armature position, is used for this purpose. In the second publication, a distribution of the magnetic flux dependent on the armature position is recorded by way of the alteration of induced voltages in suitably arranged coils.

The publication of A. Arabia et al., "Electrical Impedance Imaging Using Eddy Current", in the International Journal of Electrical, Computer, Energetic, Electronic and Communication Engineering, Vol. 2, No. 4, 2008, pp. 597-600, describes the technology of electrical impedance tomography that is used to determine the spatial distribution of electrical conductivity within a sample. Here the fact is utilised that the magnetic field of a coil causes an eddy current distribution in the sample, which depends on the conductivity distribution in the sample and the field distribution of the magnetic field. The voltage differences in the sample caused by different distances between the magnetic core and the sample are measured between two points on the sample, and an image of the conductivity distribution within the sample is then generated from the different measurements. This publication therefore addresses a completely different technical field.

The object of the present invention consists in the specification a method and an arrangement for determining the armature position of an electromagnet, which can be implemented cost effectively, and can also easily be retrofitted to existing magnet systems.

PRESENTATION OF THE INVENTION

The object is achieved with the method and the arrangement according to patent claims 1 and 10. Advantageous embodiments of the method and the arrangement are the subject matter of the dependent claims, or can be found in the following description together with the examples of embodiment.

In the proposed method for determining the armature position of an electromagnet, at least one voltage difference is measured on the yoke or armature of the electromagnet between two measuring points on the yoke or armature, or between one measuring point on the yoke or armature and a reference potential, and the armature position relative to a reference position on the electromagnet is determined from the measured voltage difference. The measurement takes place during the operation of the electromagnet, that is to say, while a current flows through the coil of the electromagnet. It can take place continuously, or in a repetitive manner, or only when the armature position is to be detected. Determining the armature position (deviating from a null position) by measuring the voltage difference(s) requires that the particular armature position to be determined causes a non-homogeneous distribution of the eddy currents induced in the yoke. This is the case with many embodiments of electromagnets and many armature positions. The positions of the measuring points on the yoke or armature are selected such that potential differences or changes in the yoke or armature caused by the particular armature position when deflected from the null position can be detected via the measured voltage difference. Here the null position is understood to be an armature position in which there is a homogeneous eddy current distribution and thus no potential differences in the yoke or armature, in particular the idle position of the armature on the yoke.

The method thus uses the potential differences in the yoke or armature, generated by a non-homogeneous eddy current distribution in the event of a deflection of the armature, to determine the instantaneous armature position relative to a reference position from these potential differences. In particular, the reference position can be the idle position of the armature on the yoke, in which the magnetic circuit is closed. Depending on the build of the electromagnet and the arrangement of the measuring points, the armature position can be determined in up to three dimensions.

In the proposed method and associated arrangement, the eddy currents occurring in the yoke or armature during operation of the electromagnet are used to determine the position, in particular the location and/or orientation, of the armature. If a time-varying current is applied to a magnet system, it produces a time-varying flux. This results in an induced electrical voltage $u_{ind}$:

$$u_{ind} = \oint E ds = \frac{-d\phi}{dt}.$$

As a result eddy currents $i_{wirb}$ occur in the electrically conductive material of the yoke, and these in turn cause an induced magnetic field $H_{ind}$:

$$i_{wirb} = -\frac{1}{R_{el}}\frac{d\phi}{dt} = \oint H_{ind} dl.$$

In the case of a homogeneous distribution of the eddy currents, the same potential prevails in the whole of the electrically conductive material. If the distribution of the eddy currents is non-homogeneous, potential differences arise. These potential differences can be measured as voltage differences on the yoke or on the armature. For this purpose, in the proposed method and the associated arrangement, electrical pick-ups are attached to the fluxed and electrically conductive material of the magnet system, that is to say, on the yoke or armature, of the electromagnet. By defining a coordinate system and evaluating the measured voltage differences, conclusions can be drawn about the armature position relative to the yoke.

In an advantageous design of the proposed method, the one or plurality of measured voltage differences are compared with values of a calibration curve or calibration table that has Previously been created for this electromagnet. The said calibration curve or calibration table specifies the particular armature position for each value of voltage difference measured at the corresponding measuring points. In this manner, the armature position can be precisely determined by measuring the one or plurality of voltage differences.

In a further design, the armature position is determined on the basis of a dependence, derived from the law of induction, of the magnitude of voltage difference on the distance between the armature and the reference position. This determination is based on an estimation or simulation, and is therefore not as accurate as the previous design with the calibration curve or calibration table. For many applications, however, determining the approximate armature position is sufficient to determine, for example, the open or closed position of an actuator.

A plurality of voltage differences between different measuring points on the yoke or on the armature are preferably measured in order to determine the armature position. This is particularly advantageous if the armature position is to be determined in more than one dimension, that is to say, on more than one axis. At least two voltage differences are preferably measured in each case between two measuring points, which in each case are located on axes that are perpendicular to one another. Here the measuring points on each axis are preferably as far apart from one another as possible to achieve a high sensitivity, as in the case when measuring only one voltage difference. The positions of the selected measuring points depend on the type of electromagnet, that is to say, on the geometrical shape of the yoke and the possibilities for movement of the armature. The measuring points should also be easily accessible.

In the case of electromagnets in which the armature can also assume positions along an axis that do not trigger any non-homogeneous distribution of the eddy currents in the yoke or armature, such an axis position can be determined if necessary by recording and evaluating the coil current, as is known from the prior art already cited. Other positions are determined by measuring the voltage differences.

The proposed arrangement comprises an electromagnet, which has at least one coil, a yoke, and an armature, which can move relative to the yoke. On the yoke or armature of the electromagnet at least one electrical pick-up is attached between two measuring points, by way of which a voltage difference between the two measuring points can be measured. Alternatively, the pick-up can also be formed between only one measuring point and a reference potential. The arrangement further comprises a measuring device connected to the electrical pick-up for measuring the voltage difference, and an evaluation device that determines and outputs an armature position relative to a reference position on the electromagnet on the basis of the measured voltage difference.

The arrangement is embodied in one or more designs such that the different forms of embodiment of the method described above can be executed.

The proposed method and the associated arrangement can be used in all technical fields in which the armature position of an electromagnet is to be monitored or determined. The method and arrangement enable the armature position to be detected in up to three axes. The measuring system of the arrangement can be retrofitted to existing electromagnets without having to change their build. For this purpose electrical contact with the yoke or the armature of the electromagnet in question need only be made at at least one measuring point. This can be done, for example, by clamping, soldering or screwing the appropriate electrical contacts to the yoke or the armature.

BRIEF DESCRIPTION OF THE FIGURES

The proposed method and the associated arrangement are explained in more detail in what follows, using two examples of embodiment in conjunction with the figures. Here.

PATHS TO EMBODIMENT OF THE INVENTION

Figure 1:
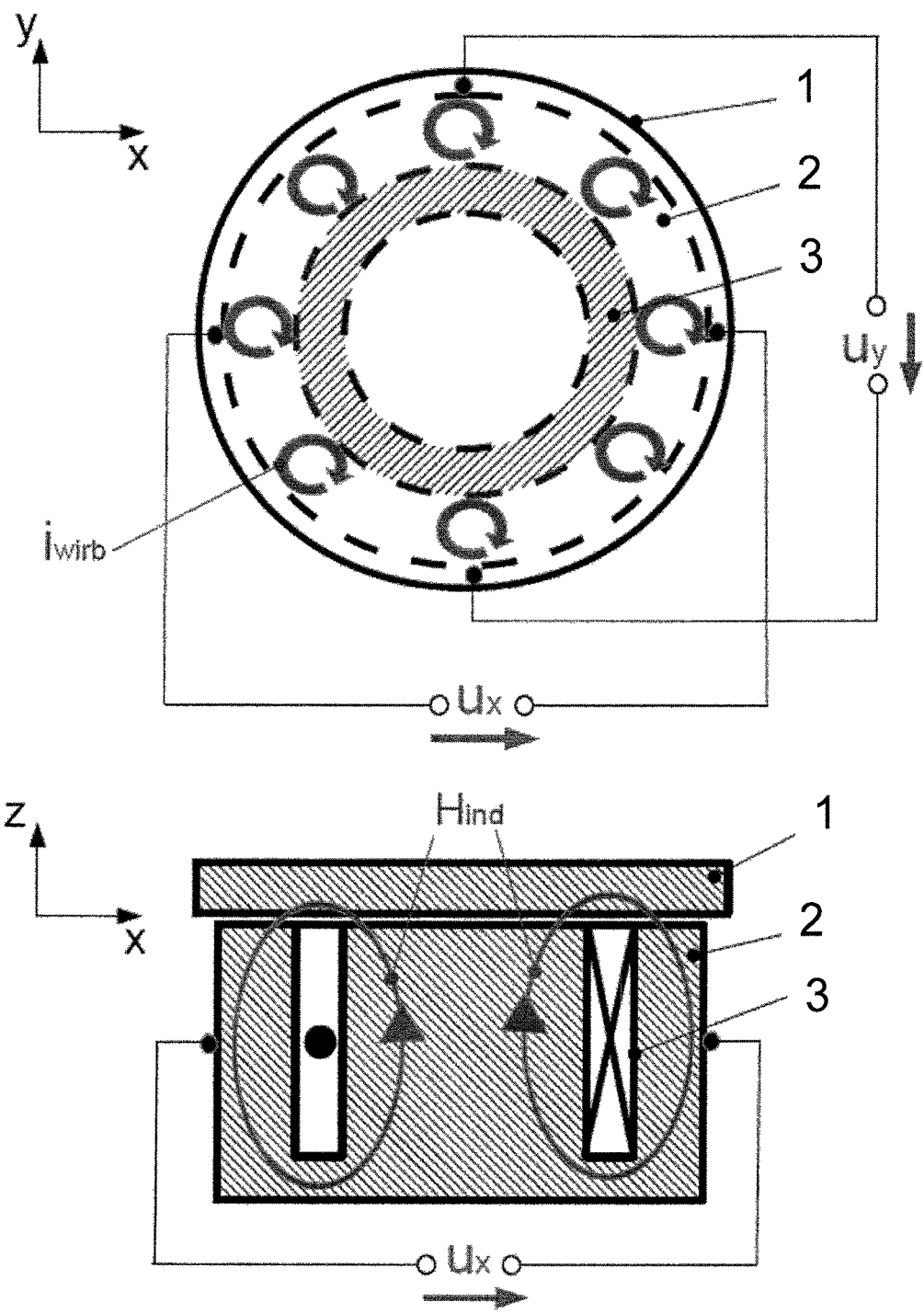
FIG. 1 shows an example of the proposed arrangement with a rotationally symmetric electromagnet, with the armature in the idle position.
Figure 2:
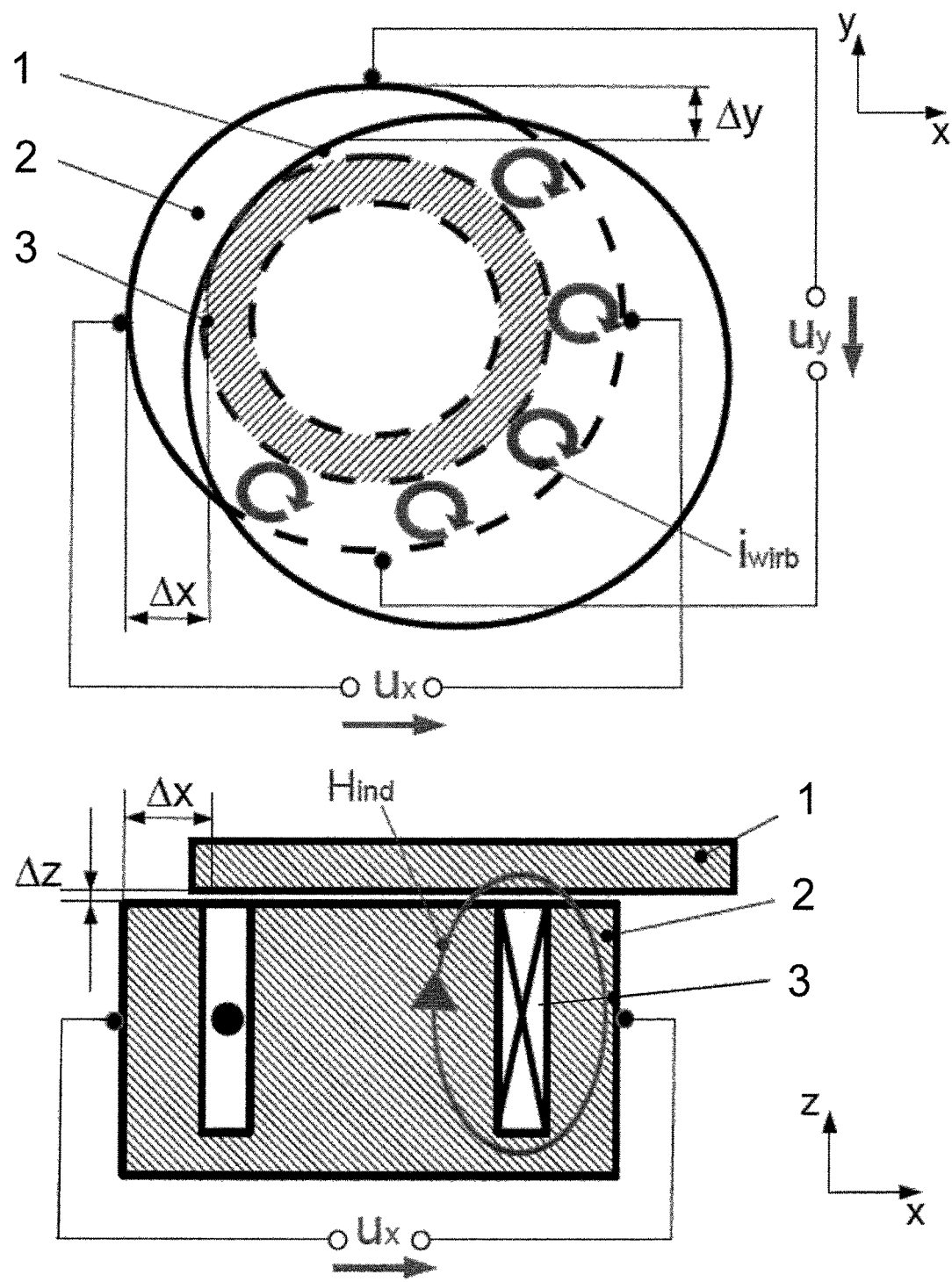
FIG. 2 shows the arrangement as in FIG. 1, with the armature in a deflected state.

The proposed method and the associated arrangement are explained once again in conjunction with FIGS. 1 and 2, on the basis of an example of a rotationally symmetrical electromagnet. Here FIG. 1 shows a plan view of the electromagnet 1 in the upper part of the figure, in which the resting armature 1 can be seen. The yoke 2 located under the armature, and the coil 3, are also indicated in this part of the figure. In the lower part of FIG. 1, the said electromagnet is again shown, this time in cross-section, wherein the direction of the magnetic field $H_{ind}$ generated by the current flowing through coil 3 is also indicated by the circulating arrows. In FIG. 1, the armature 1 is in the idle state in which the magnetic circuit is closed by the armature. There is therefore no displacement of the armature relative to the yoke 2, the armature 1 is located in a null setting or null position. In this state, a homogeneous distribution of the eddy currents in the yoke 2 can be assumed.

In this example, two voltage differences $u_y$ and $u_x$ are measured, in each case between two measuring points on the yoke 2. In this example, the axes of the two measuring points in each case are at right angles to one another, in one case parallel to the x-axis, and in the other case parallel to the y-axis, as shown in FIG. 1. The evaluation device is not shown in either this figure or the following FIGS. 2 to 4.

The voltage difference $u_x$ and the voltage difference $u_y$ are both zero in the case of the homogeneous distribution of the eddy currents in the yoke, since there is no potential difference present. If the armature 1 is now displaced from the null position by $\Delta x$ and/or $\Delta y$, as shown in FIG. 2, this results in a non-homogeneous distribution of the eddy currents and thus in a potential difference in the yoke 2. The voltage differences $u_x$ or $u_y$ are no longer equal to zero. By evaluating the amplitudes of these voltage differences, the precise armature position 1 relative to the yoke 2 in the x and y directions can then be determined.

With this electromagnet, a displacement in the z-direction can only be detected by measuring the voltage differences if there is at the same time a displacement in the x-direction, in the y-direction, or in the x- and y-directions. Such a displacement in the z-direction has the same effect on the amplitude of $u_x$ and $u_y$.

If, however, a displacement occurs solely in the z-direction, this cannot be detected via the voltage differences $u_x$ and $u_y$. If the displacement is solely in the z-direction, the distribution of the eddy currents remains homogeneous. There are a number of possible options for determining a displacement of the armature in the z-direction alone. One possibility is to undertake additionally an evaluation of the coil current by way of a measuring shunt, as is of known prior art. Another possibility consists in making a number of asymmetrical electrical contacts on the circumference of the yoke, which enables the detection of the armature in the z-direction. The possibility of detecting the armature position in the z-direction also exists by making electrical contacts on the armature in a skilled manner.

Figure 5:
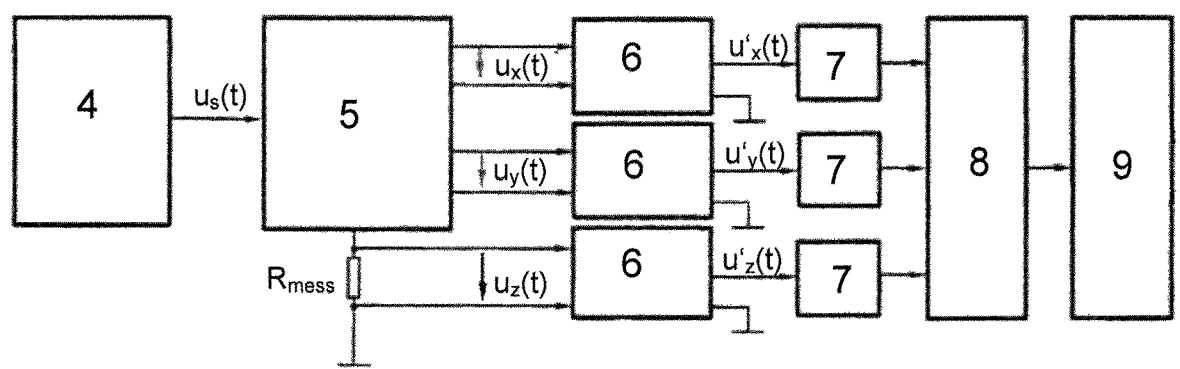
FIG. 5 shows an example of the measuring and evaluation device of the proposed arrangement.

The measurement and evaluation for both variants, that is to say, based solely on the voltage differences, or in combination with the detection of the coil current, can be carried out with equipment that is of known prior art. To this end FIG. 5 shows an example of a measurement and evaluation circuit. The power supply 4 generates a time-varying current and/or voltage, which is fed into the coil of the electromagnet 5. The voltage differences $u_x$, $u_y$ and $u_z$ are converted into signals $u'_x$, $u'_y$ and $u'_z$ by differential amplifiers 6. Here the voltage differences $u_x$ and $u_y$ between the electrical pick-ups on the yoke of the electromagnet 5 are measured, the voltage difference $u_z$ results from the measurement of the coil current via a measuring shunt ($R_{meas}$). The signals $u'_x$, $u'_y$ and $u'_z$ are then processed by analogue-to-digital converters 7 and forwarded to a microprocessor 8. The microprocessor 8 evaluates the signals, and transmits the result to an I/O-interface 9 to output the armature position determined.

Figure 3:
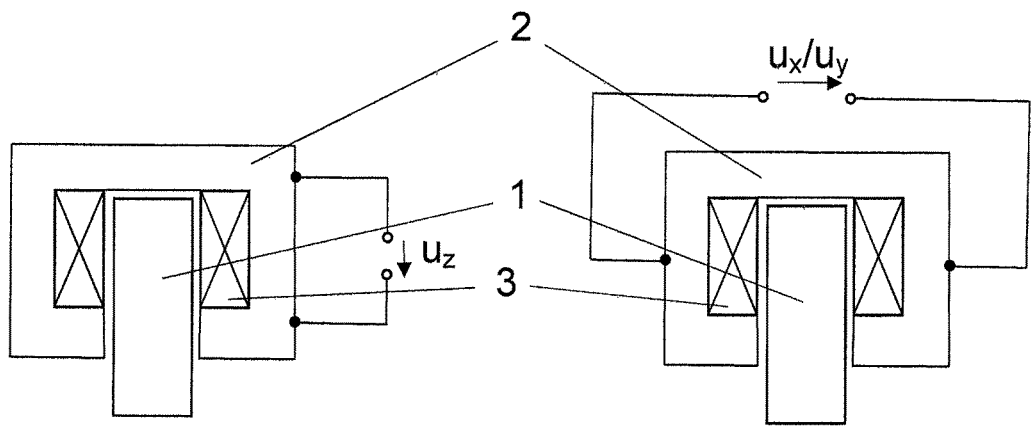
FIG. 3 shows another example of the proposed arrangement in cross-section, with an electromagnet with a plunger armature.
Figure 4:
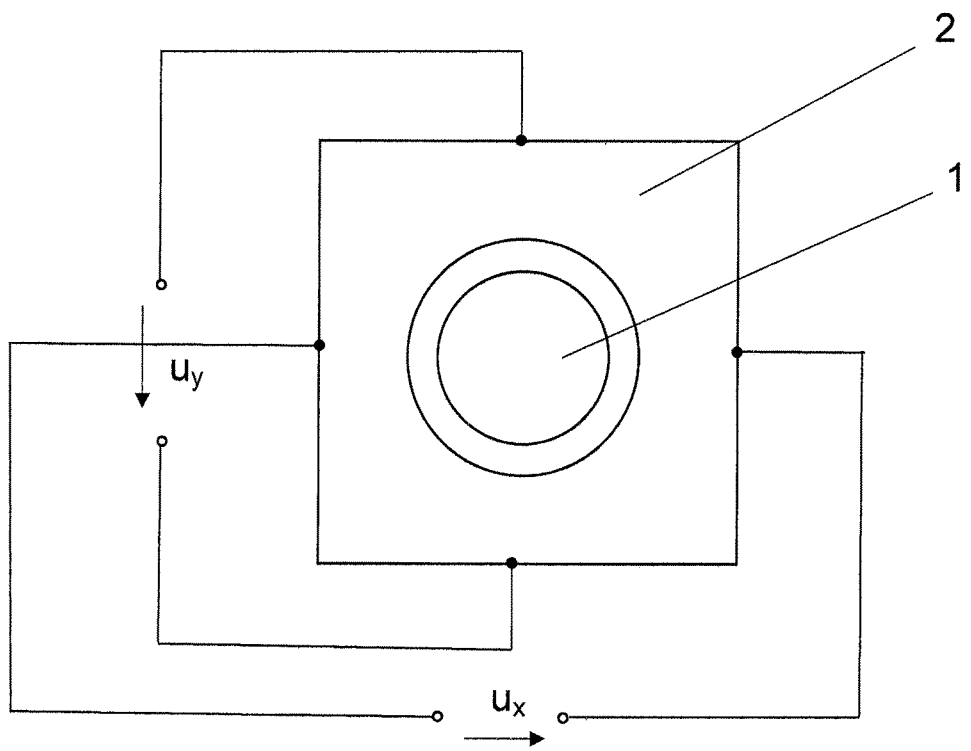
FIG. 4 shows the arrangement of FIG. 3 in a view from below.

FIG. 3 shows an example of a further design of the proposed arrangement, with an electromagnet that has a plunger armature. On the left-hand side of FIG. 3 can be seen the yoke 2 with the coil 3, in which is arranged the plunger 1. The detection of the armature position in the z-direction takes place by measuring the voltage difference $u_z$ at the two measuring points indicated on the left-hand side of the figure. An armature tilt is measured by measuring $u_x$ and $u_y$ between the measuring points indicated on the right-hand side of FIG. 3, In this part of the figure, only one of the two pairs of measuring points can be discerned, since the second pair of measuring points lies in the plane at right angles to the plane of the figure. This can be seen in FIG. 4, which shows the said arrangement once again in a view from below. By means of an asymmetrical arrangement of the measuring points for the measurement of $u_x$ or $u_y$, in which, for example, the two measuring points for the measurement of the voltage difference on the right-hand side of FIG. 3 are not at the same axial height, the armature position in the z-direction can also be determined by measuring the voltage difference.

REFERENCE LIST

1 Yoke
2 Armature
3 Call
4 Power supply
5 Electromagnet
6 Differential amplifier
7 Analogue-digital converter
8 Microprocessor
9 I/O-interface

The invention claimed is:

1. A method for determining an armature position of an electromagnet, the method comprising:
   measuring at least one voltage difference, on a yoke of the electromagnet or on an armature, between two measuring points on the yoke or armature, or between one measuring point on the yoke or armature and a reference potential, via which potential differences in the yoke or armature caused by a deflection of the armature from a null position can be detected, and
   determining the armature position relative to a reference position on the electromagnet from the measured voltage difference.

2. The method in accordance with claim 1, further comprising:
   determining the armature position on the basis of a calibration curve or calibration table that has previously been created for the electromagnet.

3. The method in accordance with claim 1, further comprising:
   determining the armature position on the basis of a dependence, derived from the induction law, of the magnitude of the voltage difference on the armature position relative to the reference position.

4. The method in accordance with claim 1, further comprising:
   selecting the two measuring points on the yoke or armature, between which the voltage difference is measured, such that they are as far apart from one another as possible.

5. The method in accordance with claim 1, further comprising:
   measuring a plurality of voltage differences between different measuring points on the yoke or armature in order to determine the armature position.

6. The method in accordance with claim 5, further comprising:
   measuring at least two voltage differences in each case between the measuring points, which in each case are located on axes that are perpendicular to one another.

7. The method in accordance with claim 1, further comprising:
   arranging the at least two measuring points on the yoke or armature, between which the voltage difference is measured, asymmetrically on the yoke or armature.

8. The method in accordance with claim 1, further comprising:
measuring in addition a coil current of the electromagnet via a measuring shunt, and evaluating the coil current so as to determine positions of the armature that do not cause any potential differences in the yoke.

9. The method in accordance with claim 1, further comprising:
measuring the at least one voltage difference via at least one electrical pick-up on the yoke or armature.

10. An arrangement system with an electromagnet, the arrangement system comprising:
at least one coil, a yoke, and an armature, which can move relative to the yoke;
at least one electrical pick-up attached to the yoke or the armature for measuring a voltage difference between two measuring points, or between one measuring point and a reference potential, via which pick-up electrical contact is made at the measuring points with the yoke or armature;
a measuring device connected to the at least one electrical pick-up for measuring the voltage difference; and
an evaluation device configured to determine and output an armature position relative to a reference position on the electromagnet based on the measured voltage difference.

11. The arrangement system in accordance with claim 10, further comprising:
a plurality of electrical pick-ups for purposes of measuring a plurality of voltage differences are attached to the yoke or the armature, and are in each case connected to the measuring device for measuring the voltage difference, wherein the evaluation device is designed such that it determines and outputs the armature position relative to the reference position from the measured voltage differences.

12. The arrangement system in accordance with claim 11, further comprising:
at least two of the electrical pick-ups are attached to the yoke or on the armature such that their measuring points lie on axes at right angles to one another.

13. The arrangement system in accordance with claim 10, wherein the arrangement system has a further measuring device measuring a coil current of the electromagnet, and the evaluation device evaluates the measured coil current for determining positions of the armature that do not cause potential differences on the yoke or armature.

* * * * *